've# 2,924,527

DUCK FEEDS

Jerome L. Martin, Terre Haute, Ind., assignor to Commercial Solvents Corporation, Terre Haute, Ind., a corporation of Maryland No Drawing. Application May 29, 1958
Serial No. 738,652

12 Claims. (Cl. 99—4)

My invention relates to duck feeds, and more particularly, it relates to duck feeds containing a compound having the following structural formula:

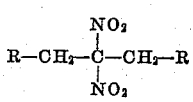

where R is a radical selected from the group consisting of hydrogen, lower alkyl, hydroxy, lower hydroxy alkyl, carbamyl, and lower carbamyl alkyl.

The tend in modern human nutrition is toward the consumption of diets containing reduced amounts of animal fats. In line with this trend, animal nutritionists have sought ways to make the domesticated duck less greasy when cooked and therefore more acceptable to the modern palate.

I have now discovered that ducks fed the above-described nitroalcohols and carbamates are relatively lean and produce a tasty, non-greasy food when baked.

Compounds coming within the above-described structural formula include: 2,2-dinitropropane, 2,2-dinitrobutane, 2,2-dinitro-1-propanol, 2,2-dinitro-1-propanol carbamate, 2,2-dinitro-1,3-propanediol dicarbamate, 3,3-dinitropentane, 3,3-dinitro-1-pentanol, etc.

Ducks are fed two types of rations. Young ducks are fed a high protein-low carbohydrate feed; while older ducks are fed a high-carbohydrate, low-protein feed, which causes rapid growth and is relatively cheap. My additives are fed to the ducks along with high energy diets, as I have found that my additives have the greatest effect on ducks fed the most economical low protein-high carbohydrate diets. Thus, I have found that ducks fed additive-supplemented starter rations, such as a 21% protein-800 calorie per pound diet, show little or no decrease in total fat; while ducks which have been fed an additive-supplemented growing ration, such as a 15% protein-1000 calorie per pound diet, show a decided decrease in total fat.

Generally, I add from about 5 to about 500 g. of my additives to each ton of high carbohydrate content feed to obtain fat reduction without unduly reducing the feed efficiency of the ducks. The additives are usually mixed with a small amount of corn or soybean meal, which is then blended into a still larger portion of feed. This procedure is carried out with larger and larger portions of feed until the additive is evenly distributed throughout the feed.

It is to be understood that not all of my compounds are active to the same degree and that the active ingredients of my invention may be utilized individually or as mixtures.

The following example is given to illustrate my invention, but it is not intended that my invention be limited to the procedures, amounts of active ingredients, or described rations, but rather it is intended that all equivalents obvious to those skilled in the art be included within the scope of my invention.

EXAMPLE I

The efficacy of my invention can be easily demonstrated by feeding a duplicate lot of 15 day-old Pekin ducks a pelleted feed of the following formula:

| | | |
|---|---|---|
| Ground yellow corn | lbs | 1468 |
| Ground oats | lbs | 60 |
| Soybean oil meal, 44% | lbs | 99 |
| Fish meal, 60% | lbs | 150 |
| Dried fish solubles | lbs | 10 |
| Dried whey | lbs | 40 |
| B·Y Basic [1] | lbs | 40 |
| Alfalfa meal, 17% | lbs | 50 |
| Dicalcium phosphate | lbs | 30 |
| Ground limestone | lbs | 40 |
| MnSo$_4$, feed grade | lbs | 0.5 |
| CCC Trace Mineral [2] | lbs | 0.5 |
| Iodized salt | lbs | 5 |
| Vitamin A (10,000 u.) | gms | 272 |
| Vitamin D$_3$ (1,500 u.) | lbs | 4 |
| B·Y–21 [3] | lbs | 1 |
| Alpha-tocopherol acetate | gms | 7 |
| Niacin | gms | 40 |
| Menadione | gms | 0.5 |
| Proferm–6 [4] | lbs | 1 |
| Baciferm PB–10 [5] | lbs | 1 |

Calculated analysis

| | | |
|---|---|---|
| Protein | percent | 15.0 |
| Fat | do | 3.6 |
| Fiber | do | 3.4 |
| Calcium | do | 1.63 |
| Phosphorus | do | 0.77 |
| Energy | cal./lb | 1000 |
| Riboflavin | mg./lb | 3.29 |
| Niacin | mg./lb | 32.1 |
| Pantothenic acid | mg./lb | 5.3 |
| Choline | mg./lb | 363 |
| Vitamin A | units/lb | 4594 |
| Vitamin D$_3$ | units/lb | 1361 |

[1] Commercial Solvents Corporation commercial fermentation residues containing unknown growth factors.
[2] Calcium Carbonate Company trace mineral salt having a guaranteed analysis of:

| | Percent |
|---|---|
| Manganese, minimum | 12.20 |
| Iron, minimum | 9.60 |
| Calcium, maximum | 9.50 |
| Calcium, minimum | 7.50 |
| Copper, minimum | 0.73 |
| Zinc, minimum | 0.67 |
| Iodine, minimum | 0.38 |
| Cobalt, minimum | 0.26 |

[3] B·Y–21 is Commercial Solvents Corporation riboflavin feed supplement containing 8 mg. of riboflavin per gram of supplement.
[4] Proferm–6 is Commercial Solvents Corporation feed supplement containing 6 mg. of vitamin B$_{12}$ per pound of supplement.
[5] Baciferm PB–10 is Commercial Solvents Corporation feed supplement additive containing 7.5 grams of bacitracin per pound and 2.5 grams of procaine penicillin per pound.

Meanwhile, another duplicate lot of 15 ducks are fed the same feed to which 100 g. of 2,2-dinitropropanol has been added. At the end of 43 days the ducks are weighed, sacrificed, defeathered, finely ground, homogenized to form a blend, and the fat ether extracted therefrom.

In each instance the additive-containing feeds give a 5 to 10% by weight decrease in the amount of total fat when ducks fed the additive-supplemented feeds are compared with ducks fed the described ration containing no additives.

Now having described my invention, what I claim is:
1. A duck feed containing as an essential active ingredient a small but effective amount to reduce the formation of adipose tissue of a compound having the following structural formula:

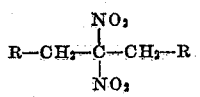

where R is a radical selected from the group consisting of hydrogen, lower alkyl, hydroxy, lower hydroxy alkyl, carbamyl, and lower carbamyl alkyl.

2. A nutrient feed for ducks containing as an essential active ingredient a small but effective amount to reduce the formation of adipose tissue of a compound selected from the group consisting of compounds having the following structural formula:

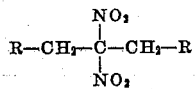

where R is a radical selected from the group consisting of hydrogen, lower alkyl, hydroxy, lower hydroxy alkyl, carbamyl, and lower carbamyl alkyl; and mixtures thereof.

3. A duck feed comprising from about 0.0005 to 0.06% by weight of a compound having the following structural formula:

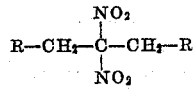

where R is a radical selected from the group consisting of hydrogen, lower alkyl, hydroxy, lower hydroxy alkyl, carbamyl, and lower carbamyl alkyl in a nutrient feed.

4. A process for the production of ducks having decreased amounts of fat which comprises feeding said ducks a nutrient feed containing a small but effective amount to reduce the formation of adipose tissue of a compound having the following structural formula:

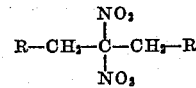

where R is a radical selected from the group consisting of hydrogen, lower alkyl, hydroxy, lower hydroxy alkyl, carbamyl, and lower carbamyl alkyl.

5. A process for the production of ducks having decreased amounts of adipose tissue which comprises feeding said ducks a nutrient feed containing from about 0.0005 to 0.06% by weight of a compound having the following structural formula:

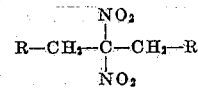

where R is a radical selected from the group consisting of hydrogen, lower alkyl, hydroxy, lower hydroxy alkyl, carbamyl, and lower carbamyl alkyl.

6. A duck feed comprising from about 0.0005 to about 0.06% by weight of 2,2-dinitropropane in a nutrient feed.

7. A duck feed comprising from about 0.0005 to about 0.06% by weight of 2,2-dinitro-1-propanol in a nutrient feed.

8. A duck feed comprising from about 0.0005 to about 0.06% by weight of 2,2-dinitro-1-propanol carbamate in a nutrient feed.

9. A duck feed comprising from about 0.0005 to about 0.06% by weight of 2,2-dinitro-1,3-propanediol in a nutrient feed.

10. A duck feed comprising from about 0.0005 to about 0.06% by weight of 2,2-dinitro-1,3-propanediol dicarbamate in a nutrient feed.

11. A duck feed comprising from about 0.0005 to about 0.06% by weight of 2,2-dinitrobutane in a nutrient feed.

12. A duck feed comprising from about 0.0005 to about 0.06% by weight of 2,2-dinitro-1-butanol in a nutrient feed.

References Cited in the file of this patent

Slater: Jr. Am. Pharm. Assoc. Scient. Ed. 43 (1954), pp. 547–50.

Mills: Proc. Soc. for Exptl. Biol. and Med. 96 (October 1957), pp. 100–2.

Dupont: Agr. News Letter, Summer 1957, 25 pp. 3 and 4.